(12) United States Patent
Bai et al.

(10) Patent No.: US 11,536,895 B2
(45) Date of Patent: Dec. 27, 2022

(54) METHOD FOR MANUFACTURING POLARIZATION-INDEPENDENT ORBITAL ANGULAR MOMENTUM MODULATOR

(71) Applicant: SHENZHEN UNIVERSITY, Guangdong (CN)

(72) Inventors: Zhiyong Bai, Shenzhen (CN); Yan Zhang, Shenzhen (CN); Yiping Wang, Shenzhen (CN); Cailing Fu, Shenzhen (CN); Shen Liu, Shenzhen (CN)

(73) Assignee: SHENZHEN UNIVERSITY, Guangdong (CN)

( * ) Notice: Subject to any disclaimer, the term of this patent is extended or adjusted under 35 U.S.C. 154(b) by 0 days.

(21) Appl. No.: 17/297,647

(22) PCT Filed: Nov. 28, 2018

(86) PCT No.: PCT/CN2018/117890
§ 371 (c)(1),
(2) Date: May 27, 2021

(87) PCT Pub. No.: WO2020/107254
PCT Pub. Date: Jun. 4, 2020

(65) Prior Publication Data
US 2022/0026630 A1    Jan. 27, 2022

(51) Int. Cl.
*G02B 6/02* (2006.01)
*G02F 1/133* (2006.01)
*G02F 1/1333* (2006.01)

(52) U.S. Cl.
CPC ..... *G02B 6/02123* (2013.01); *G02B 6/02038* (2013.01); *G02B 6/02085* (2013.01);
(Continued)

(58) Field of Classification Search
CPC .. G02B 6/02; G02B 6/02038; G02B 6/02123; G02F 1/01; G02F 1/13306; G02F 1/3333
See application file for complete search history.

(56) References Cited

U.S. PATENT DOCUMENTS

2008/0101754 A1    5/2008 Parker et al.
2017/0233283 A1*   8/2017 Ashrafi ............ C03B 37/01231
                                                         385/124
(Continued)

FOREIGN PATENT DOCUMENTS

CN    103969737 A    8/2014
CN    103969739 A    8/2014
(Continued)

OTHER PUBLICATIONS

International Search Report dated Aug. 16, 2019 issued in the parent application PCT/CN2018/117890 (4 pages).
(Continued)

*Primary Examiner* — Daniel Petkovsek
(74) *Attorney, Agent, or Firm* — Polsinelli PC

(57) ABSTRACT

A polarization-independent orbital angular momentum modulator based on a chiral fiber grating, a method for manufacturing the same, and an orbital angular momentum beam generator. The orbital angular momentum modulator includes an optical fiber body having a spiral fiber structure, and the spiral fiber structure has a long-period optical fiber grating effect. The optical fiber body has a periodic spiral refractive index modulation in an axial direction. A period of the spiral refractive index modulation has a magnitude of hundreds of microns, and the spiral refractive index modulation is distributed in an axial direction, a radial direction, and an angular direction of the optical fiber body, and configured to excite a spiral phase to generate an orbital angular momentum beam.

14 Claims, 4 Drawing Sheets

(52) U.S. Cl.
CPC ........ *G02F 1/1333* (2013.01); *G02F 1/13306* (2013.01); *G02B 6/02152* (2013.01); *G02B 2006/0209* (2013.01)

(56) References Cited

U.S. PATENT DOCUMENTS

2019/0290100 A1\* 9/2019 Ramachandran .. G02B 21/0032
2021/0257804 A1\* 8/2021 Gan .................... H01S 3/06712

FOREIGN PATENT DOCUMENTS

| CN | 106526741 A | \* | 3/2017 | ......... G02B 6/02123 |
| CN | 106842417 A | \* | 6/2017 | ......... G02B 6/02095 |
| CN | 208000395 U | | 10/2018 | |

OTHER PUBLICATIONS

Shin et al., "High strength coupling and low polarization-dependent long-period fiber gratings based on the helicoidal structure", Optical Fiber Technology 14, pp. 323-327 (2008).

\* cited by examiner

METHOD FOR MANUFACTURING POLARIZATION-INDEPENDENT ORBITAL ANGULAR MOMENTUM MODULATOR

This application is a National Phase for International Application PCT/CN2018/117890, filed on Nov. 28, 2018 and entitled "CHIRAL FIBER GRATING-BASED POLARIZATION-INDEPENDENT ORBITAL ANGULAR MOMENTUM MODULATOR, PREPARATION METHOD THEREFOR, AND ORBITAL ANGULAR MOMENTUM BEAM GENERATOR", which is incorporated herein by reference in its entirety.

TECHNICAL FIELD

The present disclosure relates to the technical field of orbital angular momentum application, and in particular, to a polarization-independent orbital angular momentum modulator based on a chiral fiber grating, a method for manufacturing the same, and an orbital angular momentum beam generator.

BACKGROUND

Vortex light carrying orbital angular momentum (OAM) is quite different in wavefront structure from conventional plane waves, spherical waves, and other polarized light. Vortex light exhibits a unique spiral wavefront structure around the center of the beam, and its phase factor has a term that can be expressed by a mathematical formula exp (il$\theta$), where $\theta$ is the rotational phase angle, and l is the topological charge of the optical vortex.

In the related art, a Spiral Phase Plate (SPP) can improve conversion efficiency without changing a mode. The spiral phase plate is an optical modulation device having a non-uniform thickness, one side of the spiral phase plate is a plane, and the other side of the spiral phase plate is a spiral curved surface dielectric disk having a thickness varying with azimuth. The board thickness of the spiral phase plate varies with the azimuth by h=l$\lambda\theta$/2$\pi$r (n−1), where n is the refractive index of the material, l is the topological charge value of the generated orbital angular momentum beam, and $\theta$ is the azimuth. When a beam of Gaussian light passes through the transmission-type medium plate, the passed thicknesses and the refraction angles at different radii are different, and different optical path differences are obtained, thus causing different phase differences. For a specific wavelength, a topological charge of l can be generated if a phase difference of 2l$\pi$ is resulted by rotating one circle. The method can intuitively generate a spiral phase without other auxiliary equipment. However, it is impossible to simultaneously generate a plurality of orbital angular momentum beams of different orders by using a single spiral phase plate, and the orbital angular momentum beams can be generated only at a specific operating wavelength. In addition, the screw pitch of the spiral phase plate in the angular direction is strictly required, and a very precise manufacture technique is required.

The function of the diffractive optical element (Diffractive Optical Elements, DOEs) can be realized by using the computer-generated hologram by means of the spatial modulator. By computer program control, different voltages can be applied to the liquid crystal screen of the spatial light modulator, and the crystal morphology can be changed, so that different holograms can be applied to the liquid crystal screen. The topological charges of the generated orbital angular momentum beams can be flexibly controlled by using different holograms. However, spatial light modulators have the disadvantages of being expensive, having polarization dependence and low coupling efficiency, and generating only a low-power orbital angular momentum beam.

The spiral phase can be excited by a long-period fiber grating in combination with a pressure plate, a rotator, or a polarization controller. The long-period fiber grating implementation mode is coupled from fundamental mode to high-order mode, while other attachments may produce a phase difference of ±$\pi$/2 between the coupled high-order modes. Although this method has the advantages of high coupling efficiency, low insertion loss, light weight, low cost, electromagnetic interference resistance, and full compatibility with optical fiber communication systems. However, the long-period fiber grating excitation spiral phase requires additional attachments, so as to achieve phase modulation, and polarization dependence exists.

In summary, the related art, during realization of spiral phase excitation, has the problems of wavelength dependence, polarization dependence, complex structure, and difficulty in manufacture.

SUMMARY

Accordingly, it is necessary to provide a polarization-independent orbital angular momentum modulator based on a chiral fiber grating, a method for manufacturing the same, and an orbital angular momentum beam generator, in order to solve the problems of wavelength dependence and polarization dependence, complex structure, and difficulty in manufacture in the related technology for exciting a spiral phase.

A polarization-independent orbital angular momentum modulator includes:

an optical fiber body, having a spiral optical fiber structure with an effect of a long-period optical fiber grating.

The optical fiber body has a periodic spiral refractive index modulation in an axial direction. A period of the periodic spiral refractive index modulation has an order of magnitude of $10^2$ microns, and the periodic spiral refractive index modulation is distributed in an axial direction, a radial direction, and an angular direction of the optical fiber body, and configured to excite a spiral phase to generate an orbital angular momentum beam.

A method for manufacturing a polarization-independent orbital angular momentum modulator includes:

heating the optical fiber body to a molten state,
twisting the optical fiber body in the molten state, and
cooling the optical fiber body.

The method for manufacturing the polarization-independent orbital angular momentum modulator described above has high stability, and the chiral optical fiber obtained by processing is uniform, and can be favorably approximate to a theoretical limit value, thereby having high coupling efficiency.

An orbital angular momentum beam generator includes:
a light source,
a polarization controller having an input connected with the light source,
a polarization-independent orbital angular momentum modulator connected with an output of the polarization controller, and
a first optical fiber jumper connected with an end of the polarization-independent orbital angular momentum modulator away from the polarization controller.

The polarization-independent orbital angular momentum modulator includes:

an optical fiber body, having a spiral optical fiber structure with an effect of a long-period optical fiber grating.

The optical fiber body has a periodic spiral refractive index modulation in an axial direction. A period of the periodic spiral refractive index modulation has an order of magnitude of $10^2$ microns, and the periodic spiral refractive index modulation is distributed in an axial direction, a radial direction, and an angular direction of the optical fiber body and configured to excite the spiral phase to generate an orbital angular momentum beam.

In the polarization-independent orbital angular momentum modulator, the optical fiber body functions as a substrate, the optical fiber body has a spiral optical fiber structure periodically distributed, and can excite the spiral phase within a certain bandwidth. The spiral optical fiber structure formed by the optical fiber body has spiral symmetry, and does not form a specific direction sensitive to polarization, and is of polarization independence. The polarization-independent orbital angular momentum modulator is an all-fiber structure, which facilitates integration in communication, has good compatibility, does not need auxiliary devices, and has the advantages of simple structure, being easy to manufacture, and the like. Further, the polarization-independent orbital angular momentum modulator has a high coupling efficiency, and the generated OAM can carry any polarization state and has a high purity. The polarization-independent orbital angular momentum modulator can be manufactured by translating and twisting the optical fiber body in a stretched state while heating the optical fiber body by means of a high-temperature heat source. Moreover, the polarization-independent orbital angular momentum modulator of a specific period can be manufactured by configuring the speed of twisting and translation, which has the advantages of being simple in processing, easy to operate, and the like. The orbital angular momentum beam generator can generate a beam with a spiral phase within a certain bandwidth, and the beam does not form a specific direction sensitive to polarization and is of polarization independence.

BRIEF DESCRIPTION OF THE DRAWINGS

In order that the embodiments of the present disclosure or the technical solutions in the prior art may be described more clearly, reference will now be made to the accompanying drawings which are to be used in the description of the embodiments or the prior art. It is obvious that the accompanying drawings in the description below are merely some of the embodiments of the present disclosure, and other drawings may be made to those skilled in the art without involving any inventive effort.

Figure 1:
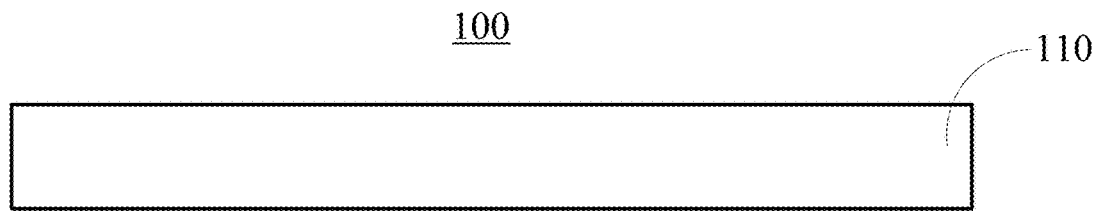
FIG. 1 is a schematic structural diagram illustrating a polarization-independent orbital angular momentum modulator according to an embodiment of the present disclosure.

DESCRIPTION OF REFERENCE NUMERALS polarization-independent orbital angular momentum modulator 100, optical fiber body 110, orbital angular momentum beam generator 400, light source 410, polarization controller 420, first optical fiber jumper 430, second optical fiber jumper 440, single-mode optical fiber 450, and few-mode optical fiber 460.

DETAILED DESCRIPTION OF THE EMBODIMENTS

In order that the above objectives, features, and advantages of the present disclosure may be more readily understood, the embodiments of the present application will be described in detail with reference to the accompanying drawings. In the following description, numerous specific details are set forth in order to facilitate a thorough understanding of the present disclosure. However, the present disclosure can be implemented in many other ways different from those described herein, and those skilled in the art can make similar modifications without departing from the spirit of the present disclosure, and thus the present disclosure is not limited to the specific implementations disclosed below.

It should be noted that when an element is referred to as being "fixed to" another element, it may be directly on the other element or there may be an intermediate element. When one element is considered to be "connected to" the other element, it may be directly connected to the other element or an intermediate element may also present.

Unless defined otherwise, all technology and scientific terms used herein have the same meaning commonly understood by one of ordinary skill in the art to which this disclosure belongs. The terminology used in the specification of this disclosure is for the purpose of describing specific examples only and is not intended to limit the disclosure. As used herein, the term "and/or" includes any and all combinations of one or more of the relevant listed items.

Figure 2:
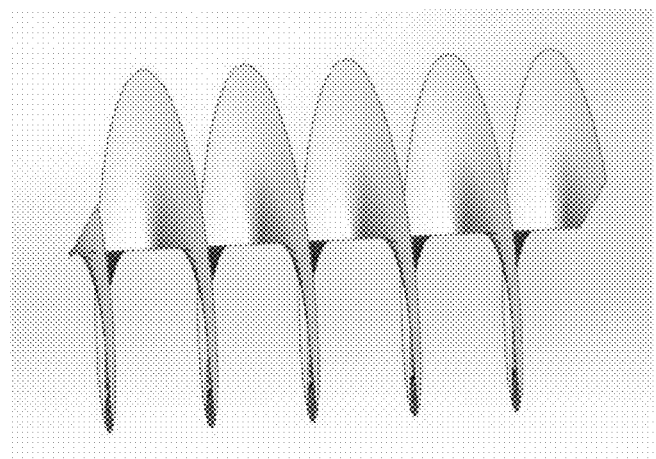
FIG. 2 is a schematic diagram illustrating a spiral refractive index modulation surface of the polarization-independent orbital angular momentum modulator according to an embodiment of the present disclosure.

Referring to FIG. 1, the present disclosure provides a polarization-independent orbital angular momentum modulator 100. The polarization-independent orbital angular momentum modulator 100 includes an optical fiber body 110. The optical fiber body 110 has a spiral optical fiber structure with an effect of a long-period optical fiber grating. The optical fiber body 110 has axial periodic spiral refractive index modulation, as shown in FIG. 2. A period of the spiral refractive index modulation has an order of magnitude of $10^2$ microns, and the spiral refractive index modulation is distributed in an axial direction, a radial direction, and an angular direction of the optical fiber body 110, and is used to excite the spiral phase to generate an orbital angular momentum beam.

The optical fiber body 110 has the periodic spiral refractive index modulation in the axial direction of the optical fiber. Along the axial direction of the optical fiber, the modulation period of the fiber grating is in the range from 200 μm to 2000 μm. In the periods within this range, the fiber grating resonance peak is generated in the (C+L)-band, facilitating integration with the communication system. The refractive index modulation period has the order of magnitude of $10^2$ microns, so that the spiral optical fiber structure has an effect of the long-period fiber grating. The spiral optical fiber structure is a core structure in a spiral shape, and can generate a spiral-shaped refractive index modulation for incident light. This refractive index modulation, different from the refractive index modulation of conventional long-period fiber gratings, is distributed along an axial direction, a radial direction, and an angular direction of the optical fiber. Thus, in one fiber grating period, the light incident on the fiber grating will be affected by the spiral refractive index distribution to produce an additional spiral phase, in addition to the high-order mode generated by the light incident due to the fiber grating reflection. The high-order mode and the spiral phase are resonantly enhanced under the action of a plurality of modulation periods of the fiber grating, thereby forming a high-order mode having a spiral phase, that is, an orbital angular momentum beam. Since the formed orbital angular momentum beam is only affected by the spiral refractive index modulation and is independent of the electric field vibration direction of the incident light, the orbital angular momentum modulator 100 may be used to excite a polarization-independent orbital angular momentum pattern.

In the polarization-independent orbital angular momentum modulator 100, a chiral fiber grating functions as a substrate, so that the orbital angular momentum can be directly coupled without other auxiliary devices such as a polarization controller and a stress modulation plate. The polarization-independent orbital angular momentum modulator 100 has a uniform spiral refractive index modulation structure, and can periodically scatter the fundamental mode light. Due to the presence of the spiral perturbation in the polarization-independent orbital angular momentum modulator 100, the planar phase of the fundamental mode can be periodically changed. The orbital angular momentum modulator 100 has two functions, one is to generate orbital angular momentum beams, and the other is to converse the orbital angular momentum beams. For the generation of the orbital angular momentum beam, because of the spiral refractive index modulation, the generation of the spiral phase can be realized by using a light incident input of any polarization state, thereby generating the orbital angular momentum beam. The energy of the fundamental mode light can be coupled to the high-order mode by means of resonance, and the planar phase of the fundamental mode light can be converted into a spiral form by means of periodic resonance, so that an excitation of the spiral phase is realized, that is, a generation of the orbital angular momentum is realized.

In an embodiment, the optical fiber body 110 is a dual-mode optical fiber or a quad-mode optical fiber. The optical fiber body may also be one of other few-mode optical fibers. The optical fiber body 110 may include an optical fiber core and a cladding. A diameter of the optical fiber core may be 19 microns, and a diameter of the cladding may be 125 microns. The polarization-independent orbital angular momentum modulator 100 is an all-fiber device, has a spiral optical fiber structure that can directly excite the spiral phase without other auxiliaries, is beneficial to integration in communication, and has good compatibility.

The optical fiber body 110 has an axial periodic spiral refractive index modulation with uniform depth, and the modulation magnitude of the spiral refractive index ranges from $2\times10^{-4}$ to $2\times10^{-3}$. The spiral refractive index modulation is the periodic spiral refractive index modulation with uniform depth along the axial direction of the optical fiber. In an embodiment, the spiral refractive index modulation of any cross section of the optical fiber body 110 is asymmetric, and the spiral refractive index modulation decreases with increasing radius along the radial direction of the optical fiber body 110. The modulation depth of the spiral refractive index is spirally distributed to excite the spiral phase of the beam. Asymmetric spiral refractive index modulation facilitates coupling and excitation of higher order asymmetric modes. In a cross section of the optical fiber body 110 at any position in the axial direction, rotating in the angular direction for one circle, the corresponding refractive index modulation is asymmetric and disuniform, so that a phase delay of an integer multiple of $2\pi$ is realized in one period of the fiber grating. In order to achieve a mode coupling with high coupling efficiency and low insertion loss, in any one period, the modulation magnitude of the refractive index of the chiral fiber grating ranges from $2\times10^{-4}$ to $2\times10^{-3}$. In an embodiment, the length of the optical fiber body 110 ranges from 1 cm to 6 cm. In the mode coupling, the chiral fiber grating can realize excitation of the high-order fiber core mode according to the variation of the period.

Since the spiral refractive index modulation of the polarization-independent orbital angular momentum modulator 100 is an intrinsic state of the fiber grating, the function of the spiral refractive index modulation does not change with the environment, and has the advantages of not being affected by environmental conditions such as temperature, vibration, twist, and bending. It will be appreciated that the spirality of the spiral phase generated by the polarization-independent orbital angular momentum modulator 100 is only related with the spiral modulation of the chiral fiber grating itself constituting the polarization-independent orbital angular momentum modulator 100, and does not change as the polarization state of the input light changes. Further, when there is a spiral phase node l but the spirality is different, no mutual coupling will occur.

In an embodiment, the spiral optical fiber structure is of polarization independence. The spiral phase is modulated by the spiral refractive index and is not related with the polarization state of the incident light. The rotation direction of the spiral phase is determined by the rotation direction of the spiral refractive index of the fiber grating itself, and is not related with the polarization state of the incident light. The mode purity represented by the spiral phase is determined by the period and intensity of the spiral refractive index, and is not related with the polarization state of the incident light.

The spiral optical fiber structure has spiral symmetry, thus a specific direction sensitive to polarization is not formed. Therefore, the polarization-independent orbital angular momentum modulator 100 has a polarization-independent characteristic. When a fundamental mode light of an arbitrary polarization state is inputted to the polarization-independent orbital angular momentum modulator 100, the high-order modes coupled to the polarization-independent orbital angular momentum modulator 100 each have a spiral phase, so that the polarization-independent orbital angular momentum modulator 100 is of polarization independence, and the OAM generated by excitation can carry an arbitrary polarization state. That is, when the polarization state of the input light of the polarization-independent orbital angular momentum modulator 100 is arbitrarily changed, and after the input light passes through the polarization-independent orbital angular momentum modulator 100, the spiral phase may be excited. And the polarization characteristics of the excited higher order modes are consistent with the inputted fundamental mode light. In an embodiment, the polarization-independent orbital angular momentum modulator 100 has a relatively high coupling efficiency, and the purity of the generated spiral phase is independent of the polarization state, and the generated OAM has high purity. The polarization-independent orbital angular momentum modulator 110 may generate OAM within a certain bandwidth. The bandwidth may be 3 dB.

In an embodiment, the spiral optical fiber structure has the same rotation direction, either clockwise or counterclockwise. According to the different rotation directions, the polarization-independent orbital angular momentum modulators 100 may be categorized into polarization-independent orbital angular momentum modulators 100 including right-handed chiral fiber gratings (RCFG) and polarization-independent orbital angular momentum modulators 100 including left-handed chiral fiber gratings (LCFG). The polarization-independent orbital angular momentum modulator 100 may generate an orbital angular momentum beam having a topological charge of l=+1 or l=−1.

In an embodiment, the polarization-independent orbital angular momentum modulator 100 further includes a protective layer. The protective layer is disposed outside the optical fiber body 110, and mechanically protects the optical fiber body 110 to extend the service life of the polarization-independent orbital angular momentum modulator 100. The polarization-independent orbital angular momentum modulator 100 is an all-fiber device that may be conveniently connected and coupled with other optical fiber devices and is highly compatible. It will be appreciated that the polarization-independent orbital angular momentum modulator 100 has characteristics of light weight and anti-electromagnetic interference.

Figure 3:
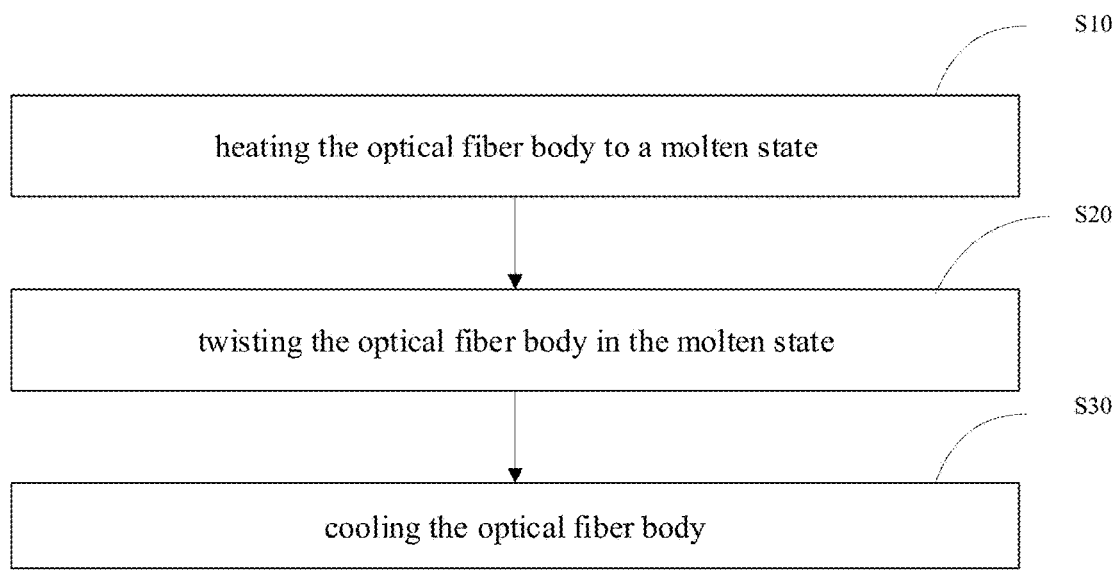
FIG. 3 is a flow chart illustrating a method for manufacturing the polarization-independent orbital angular momentum modulator according to an embodiment of the present disclosure.

Referring to FIG. 3, the present disclosure provides a method for manufacturing a polarization-independent orbital angular momentum modulator. The method for manufacturing the polarization-independent orbital angular momentum modulator includes: S10, heating the optical fiber body 110 to a molten state, S20, twisting the optical fiber body 110 in the molten state, and S30, cooling the optical fiber body 110.

Before step S10, both ends of the optical fiber body 110 are fixed, one end of the optical fiber body 110 is fixed on the optical fiber rotator, and the other end of the optical fiber body 110 is fixed in the optical fiber clamp. The optical fiber clamp and the optical fiber rotator are respectively fixed on a displacement platform.

In step S10, the optical fiber body 110 is uniformly melted under a high temperature condition. The high temperature is 1800° C. or more. The optical fiber body 110 is a few-mode optical fiber, and the few-mode optical fiber is a channel for mode high-quality transmission. The few-mode optical fiber may be a dual-mode optical fiber, a four-mode optical fiber, or the like. The few-mode optical fiber has the advantages of light weight, electromagnetic interference resistance and the like. In step S20, the molten optical fiber body 110 is evenly twisted at a high speed. In step S30, when the optical fiber body 110 is removed from the heating area, the optical fiber body 110 is rapidly cooled. In the cooling process of the optical fiber body 110, part of residual stress is frozen, thereby forming a spiral refractive index modulation to obtain a chiral optical fiber grating, thus the manufacture of the polarization-independent orbital angular momentum modulator 100 is completed.

At the same time that the optical fiber body 100 is partially heated to a molten state by the high-temperature heat source, the optical fiber body 110 is translated and twisted, thus a chiral optical fiber grating having a spiral-type refractive index profile may be manufactured. The chiral fiber grating may function as the polarization-independent orbital angular momentum modulator 100. The polarization-independent orbital angular momentum modulator 100 has a high coupling efficiency. The coupling efficiency is a ratio of the input fundamental mode light coupled in the higher order mode of the optical fiber to the input fundamental mode light. The coupling efficiency is related with the spiral grating structure and the manner of processing. The method for manufacturing the polarization-independent orbital angular momentum modulator described above has high stability, and the chiral optical fiber obtained is uniform, and can favorably approximate to a theoretical limit value, thereby having high coupling efficiency.

Figure 4:
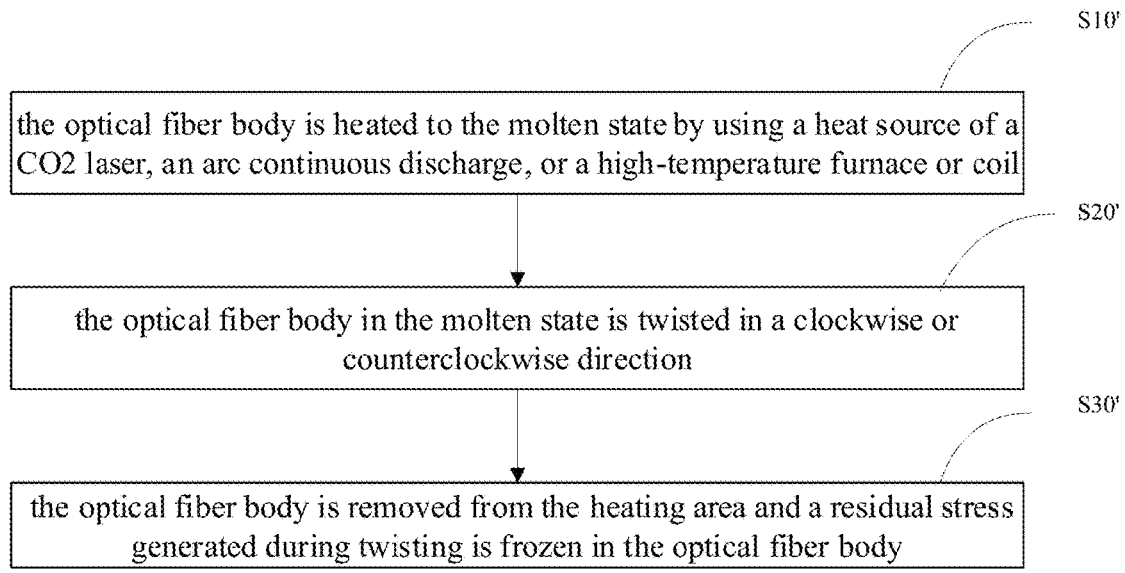
FIG. 4 is a flow chart illustrating another method for manufacturing the polarization-independent orbital angular momentum modulator according to an embodiment of the present disclosure.

Referring to FIG. 4, in an embodiment, in the step of heating the optical fiber body 110 to the molten state, namely, in step S10', the optical fiber body 110 is heated to the molten state by using a heat source of a $CO_2$ laser, an arc continuous discharge, a high-temperature furnace, or a coil. In an embodiment, in the step of twisting the optical fiber body 110 in the molten state, namely, in step S20', the optical fiber body 110 in the molten state is twisted in a clockwise or counterclockwise direction. In an embodiment, in the step of cooling the optical fiber body 110, namely, in step S30', the optical fiber body 110 is removed from the heating area and a residual stress generated during twisting is frozen in the optical fiber body 110.

Figure 5:
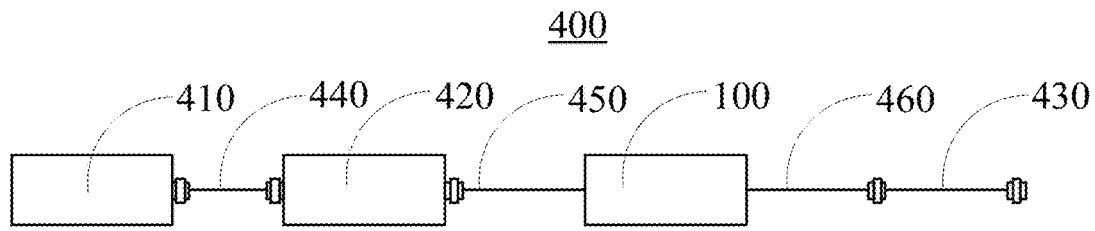
FIG. 5 shows an orbital angular momentum beam generator according to an embodiment of the present disclosure.

Referring to FIG. 5, the present disclosure provides an orbital angular momentum beam generator 400. The orbital angular momentum generator 400 includes a light source 410, a polarization controller 420, a polarization-independent orbital angular momentum modulator 100, and a first optical fiber jumper 430. The input of the polarization controller 420 is connected with the light source 410. The polarization-independent orbital angular momentum modulator 100 is connected with the output of the polarization controller 420. The first fiber jumper 430 is connected with an end of the polarization-independent orbital angular momentum modulator 100, and the end of the polarization-independent orbital angular momentum modulator 100 is away from the polarization controller 420. The polarization-independent orbital angular momentum modulator 100 includes an optical fiber body 110. The optical fiber body 110 has a spiral optical fiber structure with an effect of a long-period optical fiber grating. The fiber body 110 has a constant diameter. The optical fiber body 110 has the periodic spiral refractive index modulation in the axial direction, and the spiral refractive index modulation period has the order of magnitude of $10^2$ microns, and the spiral refractive index modulation is distributed in the axial direction, the radial direction, and the angular direction of the optical fiber body 110, and is configured to excite the spiral phase to generate the orbital angular momentum beam.

The light source 410 may be a tunable laser. The tunable laser may be tuned to be in a desired wave band. The orbital angular momentum beam generator 400 may generate a desired OAM beam in a wide bandwidth. In an embodiment, the bandwidth is 3 dB. The input light of the desired polarization state may be obtained by adjusting the polarization controller 420. The first optical fiber jumper 430 is used to connect other instruments, which makes it convenient to apply the orbital angular momentum beam generator 400 in communication. It will be appreciated that various types of optical fibers are connected by corresponding adapters, i.e., flanges.

In an embodiment, the orbital angular momentum beam generator 400 further includes a second optical fiber jumper 440. The input of the polarization controller 420 is connected with the light source 410 by means of the second optical fiber jumper 440. The second optical fiber jumper 440 ensures the stable transmission of the light beam. The second optical fiber jumper 440 may be single mode.

In an embodiment, the orbital angular momentum beam generator 400 further includes a single-mode optical fiber 450. The polarization-independent orbital angular momentum modulator 100 is connected with the output of the polarization controller 420 by means of the single-mode optical fiber 450. The single-mode optical fiber 450 may realizes a low-loss transmission of light beams between the polarization-independent orbital angular momentum modulator 100 and the polarization controller 420.

In an embodiment, the orbital angular momentum beam generator 400 further includes a few-mode optical fiber 460. The first optical fiber jumper 430 is connected with the polarization-independent orbital angular momentum modulator 100 by means of the few-mode optical fiber 460. The low-mode optical fiber 460 may ensure stable transmission of a light beam having an orbital angular momentum.

Figure 6:
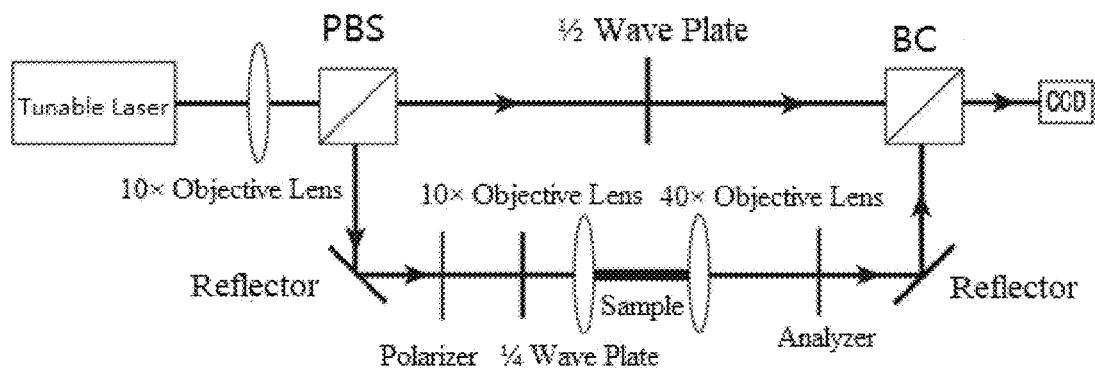
FIG. 6 is a schematic diagram illustrating a test apparatus of the polarization-independent orbital angular momentum modulator according to an embodiment of the present disclosure.

Referring to FIG. 6, the polarization dependence of the polarization-independent orbital angular momentum modulator 100 is measured by a test apparatus. A system based on spatial interference is constructed to detect the beam having the orbital angular momentum generated by the polarization-independent orbital angular momentum modulator 100. The phase of the OAM is detected by means of the OAM beam interfering with a spherical or planar wave. In this method, in space, the Gaussian beam interferes with the OAM beam with the topological charge l, where, the OAM beam with the topological charge l is generated by the polarization-independent orbital angular momentum modulator 100 based on the long-period chiral optical grating. If the two beams are coaxial in space, the interference fringes for the spherical wave show a spiral phase pattern with the topological charge l. The counterclockwise or clockwise rotation direction of the interference fringes depends on the sign of the topological charge l of the OAM beam.

The light is output from the tunable single-wavelength laser through the fiber jumper and is collimated by 10× objective lens, and then enters a Polarization Beam Splitter (PBS), to be split into two optical paths, namely, a reference optical path and a test optical path. The input light of the reference optical path passes through the ½ wave plate and then enters a beam combiner. The input light of the test optical path sequentially passes through a polarizer, a quarter-wave plate, the 10× objective lens, a sample of the polarization-independent orbital angular momentum modulator 100, 40× objective lens, and an analyzer, and then enters the beam combiner. The two optical paths meet on the beam combiner to generate interference, and finally the interference fringes are recorded in real time by an infrared CCD (Charge Coupled Device).

Further, the light emitted by the tunable laser is first collimated and amplified by the 10× objective lens. In an embodiment, the collimated and amplified beam is split by using a Thorlabs PBS of model VA5-1550. The PBS has an adjustable splitting ratio, and the two split beams are polarized light p and polarized light s, respectively. After a direction of the input light of the test optical path is changed by a reflector, the input light of the test optical path sequentially passes through the polarizer and the quarter-wave plate, to generate input lights of different polarization states. The input light includes linear polarization (LP), left-handed circular polarization (CP−), and right-handed circular polarization (CP+). Then the input light of the test optical path passes through the 10× objective lens, the polarization-independent orbital angular momentum modulator 100, and the 40× objective lens, and then enters the analyzer. The analyzer analyzes the polarization state of the generated OAM beam. The input light of the reference optical path passes through the ½ wave plate, and a vibration direction of the linearly polarized input light is regulated to be identical with the vibration direction of the test optical path light output from the analyzer, so as to ensure interference between the reference light and the test light. Finally, two paths of light are collected by a Beam Combiner (BC) for interference. In an embodiment, the model of the BC is VC5-1550, Thorlabs.

After the construction of the optical paths is completed, no reference light is first added, but the distribution of the mode field is measured by the test optical path. At the same time, two ends of the sample of the polarization-independent orbital angular momentum modulator 100 are cut by a precision cutting device, and the flatness of the end surfaces of the sample is ensured. The end surface of the sample fiber will then be secured to a platform disposed between the objective lenses by an optical fiber holder 220. In an embodiment, the optical fiber holder 220 may be a two-arm optical fiber clamp.

After the preparation work, first, the polarizer, the quarter-wave plate, and the analyzer are removed from the test optical path, and the wave length of the tunable single-wavelength laser is set to the resonant wave length of the polarization-independent orbital angular momentum modulator 100. The three-dimensional displacement table at two ends of the polarization-independent orbital angular momentum modulator 100 is accurately adjusted. The two groups of front and rear objective lenses of the polarization-independent orbital angular momentum modulator 100 are respectively converged to the left and right end surfaces of the sample of the polarization-independent orbital angular momentum modulator 100. In the debugging process, the intensity of the spot is detected in real time by means of the infrared CCD till the position of the maximum brightness of the spot is observed from the screen of the infrared CCD. At this time, the coupling efficiency from the objective lens to the polarization-independent orbital angular momentum modulator 100 is the highest.

Secondly, the polarizer, the quarter-wave plate, and the analyzer are arranged in the test optical path. A test is performed firstly in the case that the input light of the sample of the polarization-independent orbital angular momentum modulator 100 is linearly polarized light. For convenience of description, the direction parallel to the paper surface is defined as 0 degree. Since the output light of the tunable laser is linearly polarized light, a linearly polarized input light may be obtained by placing both the direction of the optical axis of the polarizer and the direction of the fast axis of the quarter-wave plate to be in the direction of 0 degree. The linearly polarized light passes through the sample of the polarization-independent orbital angular momentum modulator 100 and then the analyzer. Individual mode field information is recorded by the CCD when the transmission axis of the analyzer is located in four different angles: 0 degree, 90 degrees, 180 degrees, and 270 degrees, respectively.

Again, the reference optical path is added, so that the light in the reference optical path interferes with the light in the test optical path. The interference information is recorded by the CCD when the analyzer is located at the angles of 0 degree, 90 degrees, 180 degrees, and 270 degrees, and the phase information of the orbital angular momentum may be obtained by means of interference.

Finally, by adjusting the angle between the light transmission axis of the polarizer and the fast axis of the quarter-wave plate, the left-handed circular polarization and the right-handed circular polarization may be obtained. Each time an input light of a different polarization state is input, the above operations are repeated, thus completing the test process for the polarization-independent orbital angular momentum modulator 100.

In the optical path of the spiral phase testing apparatus for the coaxial interference testing, the polarizer, the wave plate, and the like are arranged to realize input light of arbitrary polarization state, and the characteristics of the polarization-independent orbital angular momentum modulator 100 may be tested by means of the polarization testing combining with the spiral phase. By adjusting the angle between the optical transmission axis of the analyzer and the fast axis of the quarter-wave plate, light of arbitrary polarization state such as linear polarization and circular polarization can be generated, and light of different polarization states may be input. At the same time the analyzer at the rear end may be used to analyze the polarization state of the output light. In this way it is possible to test the effect on the mode excitation at different polarization states.

Figure 7:
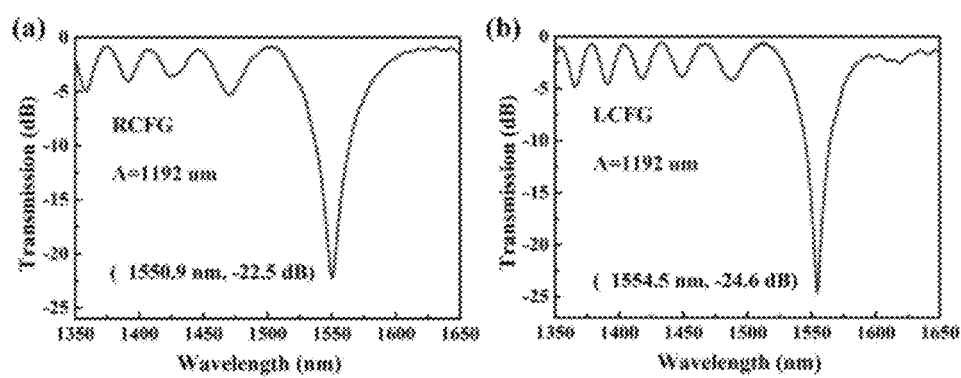
FIG. 7 shows graphs of tested results of spectrum of the polarization-independent orbital angular momentum modulator according to an embodiment of the present disclosure.

Referring to FIG. 7, the transmission spectra of right-handed and left-handed polarization-independent orbital angular momentum modulator 100 are shown in FIGS. 7(*a*) and 7(*b*). The periods of the samples of the two polarization-independent orbital angular momentum modulators 100 are both 1192 um, and the resonance peak of the right-handed polarization-independent orbital angular momentum modulators 100 is generated at a position of 1554.5 nm, and the coupling depth is −24.6 dB. The resonance peak of the left-handed polarization-independent orbital angular momentum modulator 100 is generated at a position of 1550.9 nm, and the coupling depth is −22.5 dB. The results show that the coupling efficiency of the polarization-independent orbital angular momentum modulator 100 is as high as 86%. The minor difference between the resonance peaks of the two samples of the polarization-independent orbital angular momentum modulator 100 is caused by a partially non-uniform structure of the optical grating resulting from the external jitter in the manufacturing process of the polarization-independent orbital angular momentum modulator 100. It will be appreciated that the coupling depth and periods number of optical grating, i.e., the number of spirals, are determined by the position period of the resonance peak and associated with the uniformity in the manufacturing process.

Figure 8:
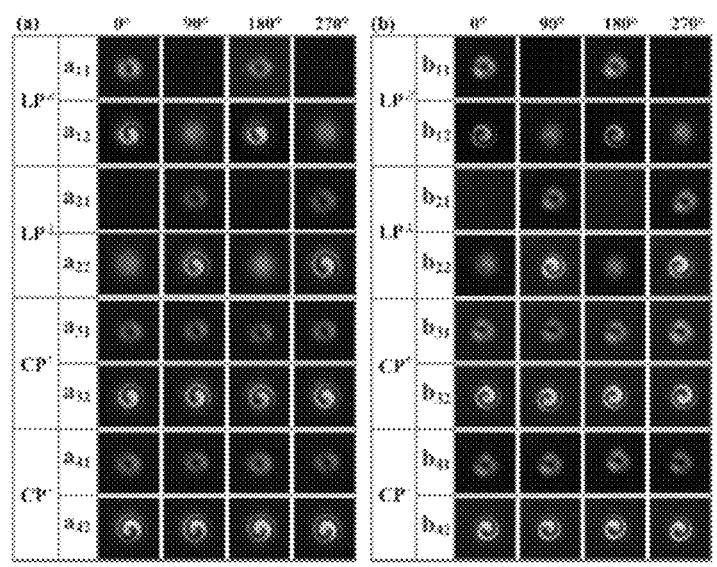
FIG. 8 shows graphs of tested results of the polarization-independent orbital angular momentum modulator of a different polarization state according to an embodiment of the present disclosure.

Referring to FIG. 8, the excitation of the orbital angular momentum at different polarization states is first measured by using the sample of the right-handed polarization-independent orbital angular momentum modulator 100, as shown in FIG. 8(*a*). When the input light is linearly polarized light, the mode field without the reference optical path is shown in a11 of FIG. 8. After the light passes through the polarization-independent orbital angular momentum modulator 100, the fundamental mode is excited to a higher order orbital angular momentum. A hollow ring can be seen from the figure, and when the analyzer is rotated for one circle, a light-dark change occurs, indicating that the generated beam has a characteristic of linear polarization. In order to observe the spiral phase information, the reference optical path is added and interferes with the test optical path, and the phase information is determined by an interference method. It can be seen from a12 of FIG. 8 that the spiral optical field profile, i.e., the topological charge l=+1, rotates counterclockwise. As can be seen from the above experiment, when the input light is linearly polarized light, the orbital angular momentum with linear polarization can be excited. Similarly, when the input light is the right-handed circular polarization (CP+), the hollow ring can be seen from a21 of FIG. 8, and when the analyzer is rotated for one circle, the intensity of the spot does not change, indicating that the polarization state of the beam is circular polarization. In addition, an interference fringe that rotates clockwise is observed, indicating that an orbital angular momentum with a topological charge of l=+1 is generated. When the polarization state of the input light is the left-handed circular polarization (CP−), there is the same phenomenon as occurs in the case of CP+. The above experiments show that the polarization-independent orbital angular momentum modulator 100 can excite the orbital angular momentum of the l=+1 in different polarization states, and has the characteristics of polarization independence. In addition, by using the left-handed spiral polarization-independent orbital angular momentum modulator 100, the orbital angular momentum of l=−1 can also be excited in different polarization states. The experiments have shown that the polarization-independent orbital angular momentum modulator 100 manufactured by the method of locally heating and translating & twisting by means of a high-temperature heat source has polarization-independent characteristics, and the device is expected to play a great role in the communication field.

The polarization-independent orbital angular momentum modulator 100 described in the present disclosure can excite the orbital angular momentum beam of order l=±1 at any polarization state based on the polarization-independent characteristic of the chiral fiber grating. The excited l=−1 or l=+1 depends only on the spirality of the spiral fiber grating of the polarization-independent orbital angular momentum modulator 100. The period has the order of magnitude of $10^2$ microns, the spiral modulation is uniform, the spectrum quality is high, and the mode coupling is clear. Moreover, the polarization-independent orbital angular momentum modulator 100 is based on the few-mode optical fiber, and is an all-fiber modulator. The modulator has advantages of small size, low cost, high coupling efficiency, easy integration, and has important applications in the fields of optical fiber communication, optical tweezers, and particle manipulation.

Each of the technical features in the above-described embodiments may be combined arbitrarily. For the sake of brevity, not all possible combinations of each of the technical features in the above-described embodiments are described. However, the combinations of these technical features should be considered to be within the scope of the present description as long as they do not contradict each other.

The above-described examples, which represent only a few embodiments of the present disclosure, are described specifically and in detail, but are not therefore to be construed as limiting the scope of the patent disclosure. It should be noted that various variations and modifications may be made by those of ordinary skill in the art without departing from the spirit and scope of the present disclosure. Accordingly, the protection scope of the present patent should be subject to the appended claims.

What is claimed is:

1. A method for manufacturing a polarization-independent orbital angular momentum modulator, comprising:
   providing the polarization-independent orbital angular momentum modulator, comprising:
   an optical fiber body having a spiral optical fiber structure having a long-period optical fiber grating effect;
   wherein the optical fiber body has a periodic spiral refractive index modulation in an axial direction, and the spiral refractive index modulation is distributed in an axial direction, a radial direction, and an angular direction of the optical fiber body, and is configured to excite a spiral phase to generate an orbital angular momentum beam;
   heating, in a heating area, the optical fiber body to a molten state;
   twisting the optical fiber body evenly and at a speed while in the molten state, thereby generating a stress in the optical fiber body; and
   cooling the optical fiber body, comprising:
   removing the twisted optical fiber body from the heating area; and
   freezing the removed twisted optical fiber body such that the stress generated during twisting is frozen into the optical fiber body.

2. The method for manufacturing the polarization-independent orbital angular momentum modulator according to claim 1, wherein in a step of the heating the optical fiber body to the molten state, the optical fiber body is heated to the molten state by any one of heat sources of a $CO_2$ laser, an arc continuous discharge, and a high-temperature furnace or coil.

3. The method for manufacturing the polarization-independent orbital angular momentum modulator according to claim 1, wherein in a step of the twisting the optical fiber body in the molten state, the optical fiber body in the molten state is twisted in a clockwise or counterclockwise direction.

4. The method of claim 1, wherein the optical fiber body is a dual-mode optical fiber or a quad-mode optical fiber.

5. The method of claim 1, wherein the optical fiber body has an axial and periodic spiral refractive index modulation with uniform depth, and an amount of the spiral refractive index modulation ranges from $2\times10^{-4}$ to $3\times10^{-3}$.

6. The method of claim 1, wherein the optical fiber body comprises an optical fiber core and a cladding.

7. The method of claim 6, wherein the optical fiber core has a diameter of 19 microns, and the cladding has a diameter of 125 microns.

8. The method of claim 1, wherein the spiral refractive index modulation of any cross section of the optical fiber body is asymmetric, and the spiral refractive index modulation decreases with increasing radius along the radial direction of the optical fiber body.

9. The method of claim 1, wherein a length of the optical fiber body is in a range from 1 cm to 6 cm.

10. The method of claim 1, wherein the provided polarization-independent orbital angular momentum modulator further includes a protective layer.

11. An orbital angular momentum beam generator, comprising:
    a light source;
    a polarization controller having an input connected with the light source;
    a polarization-independent orbital angular momentum modulator connected with an output of the polarization controller; and
    a first optical fiber jumper connected with an end of the polarization-independent orbital angular momentum modulator, the end of the polarization-independent orbital angular momentum modulator being away from the polarization controller;
    wherein the polarization-independent orbital angular momentum modulator comprises:
    an optical fiber body having a spiral optical fiber structure having a long-period optical fiber grating effect; and
    the optical fiber body has a periodic spiral refractive index modulation in an axial direction;
    and the spiral refractive index modulation is distributed in an axial direction, a radial direction, and an angular direction of the optical fiber body and configured to excite the spiral phase to generate an orbital angular momentum beam;
    the optical fiber body being formed by:
    heating, in a heating area, the optical fiber body to a molten state;
    twisting the optical fiber body evenly and at a speed while in the molten state, thereby generating a stress in the optical fiber body; and
    removing the twisted optical fiber body from the heating area; and
    freezing the removed twisted optical fiber body such that the stress generated during twisting is frozen into the optical fiber body.

12. The orbital angular momentum beam generator according to claim 11, further comprising:
    a second optical fiber jumper, an input of the polarization controller being connected with the light source via the second optical fiber jumper.

13. The orbital angular momentum beam generator according to claim 11, further comprising:
    a single-mode optical fiber, through which the polarization-independent orbital angular momentum modulator is connected with the output of the polarization controller.

14. The orbital angular momentum beam generator according to claim 11, further comprising:
    a few-mode optical fiber, through which the first optical fiber jumper is connected with the polarization-independent orbital angular momentum modulator.

* * * * *